US011552461B2

(12) United States Patent
Gell

(10) Patent No.: US 11,552,461 B2
(45) Date of Patent: Jan. 10, 2023

(54) DEVICE, SYSTEM AND RELATED METHODS FOR PULLING ELECTRICAL CORDS THROUGH CONDUIT

(71) Applicant: Luke Gell Pools, LLC, Cocoa, FL (US)

(72) Inventor: Luke Gell, Cocoa, FL (US)

(73) Assignee: Luke Gell Pools, LLC, Cocoa, FL (US)

( * ) Notice: Subject to any disclaimer, the term of this patent is extended or adjusted under 35 U.S.C. 154(b) by 35 days.

(21) Appl. No.: 17/000,894

(22) Filed: Aug. 24, 2020

(65) Prior Publication Data

US 2021/0066897 A1 Mar. 4, 2021

Related U.S. Application Data

(60) Provisional application No. 62/891,450, filed on Aug. 26, 2019.

(51) Int. Cl.
*H02G 1/08* (2006.01)

(52) U.S. Cl.
CPC ............. *H02G 1/086* (2013.01); *H02G 1/081* (2013.01)

(58) Field of Classification Search
CPC .......... H02G 1/08; H02G 1/081; H02G 1/083; H02G 1/086; H02G 1/088; H02G 1/10; H02G 9/00; H02G 9/06; H02G 9/08
USPC ........................ 254/134.3 R, 134.3 FT, 134.4
See application file for complete search history.

(56) References Cited

U.S. PATENT DOCUMENTS

| 2,924,868 | A | * | 2/1960 | Dyer | ...................... | D02G 1/161 |
| | | | | | | 406/194 |
| 3,689,031 | A | * | 9/1972 | Ruddick | ................ | H02G 1/086 |
| | | | | | | 254/134.4 |
| 5,632,356 | A | * | 5/1997 | Sells | ........................ | H02G 1/08 |
| | | | | | | 184/15.1 |
| 6,561,488 | B1 | * | 5/2003 | Walker | ................... | H02G 1/086 |
| | | | | | | 15/104.062 |
| 2010/0258771 | A1 | * | 10/2010 | White | .................... | H02G 1/081 |
| | | | | | | 254/134.3 R |

* cited by examiner

*Primary Examiner* — Lee D Wilson
*Assistant Examiner* — Alberto Saenz
(74) *Attorney, Agent, or Firm* — Mark Malek; Widerman Malek, PL

(57) ABSTRACT

An electrical wire pulling device is for pulling wire through a conduit and includes a T-shaped hollow body including a side inlet transversely intersecting a path between a top inlet and a bottom outlet, and a constrictor adjacent the side inlet. A pulling line source, including a supply of pulling line, is positioned adjacent the top inlet and configured to supply the pulling line into the top inlet and out the bottom outlet. A constrictor has a tapered section tapering towards the bottom inlet. The bottom outlet is positioned adjacent the first end of the conduit. The side inlet is coupled to a fluid source to supply a fluid into the hollow body to be pushed downward towards the bottom outlet and create a pressure differential that draws the pulling line towards the bottom outlet and into the conduit.

17 Claims, 3 Drawing Sheets

DEVICE, SYSTEM AND RELATED METHODS FOR PULLING ELECTRICAL CORDS THROUGH CONDUIT

RELATED APPLICATIONS

This application claims priority to U.S. Provisional Application Ser. No. 62/891,450 filed Aug. 26, 2019 titled "DEVICE, SYSTEM AND RELATED METHODS FOR PULLING ELECTRICAL CORDS THROUGH CONDUIT", which is incorporated herein in its entirety by reference.

FIELD OF THE INVENTION

The present invention is in the technical field of electrical wiring, and specifically electrical wiring for in-ground swimming pools, spas, hot tubs, and fountains. More specifically, the present invention relates to a device, system and method for pulling electrical cords through conduit.

BACKGROUND

In-ground swimming pools (also spas, hot tubs, and fountains etc.) may have electrical lighting. Such lights include the use of a lighting fixture that has a niche (fixture housing) that is mounted in the pool wall or floor. The light bulb is coupled to the niche, and a rigid conduit (e.g. PVC or metal) extends (e.g. underground) between the niche and a junction box or transformer (power source) to carry the light electrical cord. The conduit typically includes one or more turns (e.g. 90-degree elbows or sweeps) and may run in lengths of 25 to 200+ feet, for example.

The use of fish tape and various other methods exist for pulling the cord through the conduit from the niche to the junction box. These methods may involve multiple workers and the use of wire lubricant.

Faster, easier and more efficient approaches for pulling cord through conduit are needed.

This background section is intended to introduce the reader to various aspects of typical technology that may be related to various aspects or embodiments of the present invention, which are described and/or claimed below. This discussion is believed to be useful in providing the reader with background information to facilitate a better understanding of the various aspects and embodiments of the present invention. Accordingly, it should be understood that these statements are to be read in light of, and not as admissions of, the prior art.

SUMMARY OF THE INVENTION

It is an object of the present embodiments to provide a system, device and method to that is faster, easier and more efficient for pulling cord through conduit.

This and other objects, advantages and features in accordance with the present embodiments may be provided by an electrical wire pulling device configured to pull wire through a conduit extending between a first end at a first location, and a second end at a second location. The electrical wire pulling device includes a T-shaped hollow body including a top inlet in line with a bottom outlet, and a side inlet transversely intersecting a path between the top inlet and the bottom outlet, and a constrictor positioned within the hollow body in the path between the top inlet and the bottom outlet, and adjacent the side inlet. A pulling line source, including a supply of pulling line, is positioned adjacent the top inlet and configured to supply the pulling line into the path from the top inlet and out the bottom outlet. The constrictor has a tapered section, adjacent the side inlet, and tapering in a direction towards the bottom inlet. The bottom outlet is configured to be positioned adjacent to the first end of the conduit at the first location. The side inlet is configured to be coupled to a fluid source to supply a fluid into the hollow body and directed towards the tapered section of the constrictor to be pushed downward towards the bottom outlet and create a pressure differential that draws the pulling line from the pulling line source towards the bottom outlet and into the conduit at the first location and towards the second location.

The pulling line may be a string or a tape. In some embodiments, the pulling line source may be a spool. The fluid source may be a water source or a compressed gas source. The side inlet may be an internally threaded hose connector. A valve may be positioned at the side inlet and configured to selectively control the supply of fluid from the fluid source. The first location is adjacent a power source and the second location includes a swimming pool light niche.

Additionally, and/or alternatively, a lubricant source, including a supply of lubricant, is positioned adjacent the top inlet and configured to selectively supply lubricant into the path from the top inlet and out the bottom outlet, to lubricate an inside of the conduit. A wire attachment device may be configured to releasably attach an electrical wire to the pulling line at the second location. The wire attachment device may be a crimping-type attachment device, a lasso-type attachment device, or a self-tightening sheath-type attachment device that slides over the end of the electrical wire and self-tightens as the electrical wire is pulled by the pulling line. A pushing tip may be positioned at a distal end of the pulling line and configured to assist the fluid in drawing the pulling line though the conduit.

Other objects, advantages and features in accordance with the present embodiments may be provided by a method of pulling electrical wire through a conduit extending between a first end at a first location, and a second end at a second location. The method includes: positioning an electrical wire pulling device adjacent the first end of the conduit. The electrical wire pulling device including a T-shaped hollow body including a top inlet in line with a bottom outlet, and a side inlet transversely intersecting a path between the top inlet and the bottom outlet. A constrictor is positioned within the hollow body in the path between the top inlet and the bottom outlet, and adjacent the side inlet. A pulling line source, including a supply of pulling line, is positioned adjacent the top inlet and configured to supply the pulling line into the path from the top inlet and out the bottom outlet. The constrictor has a tapered section, adjacent the side inlet, and tapering in a direction towards the bottom inlet. The method further includes coupling the side inlet to a fluid source to supply a fluid directed towards the tapered section of the constrictor in the hollow body to be pushed downward towards the bottom outlet and create a pressure differential that draws the pulling line from the pulling line source towards the bottom outlet and into the conduit at the first end and towards the second end. Then, an electrical wire is attached to the pulling line at the second location and pulled through the conduit to the first location.

The pulling line may be a string or a tape, and the pulling line source is a spool. The fluid source may be a water source or a compressed gas source, and the side inlet may be an internally threaded hose connector. The first location may be adjacent a power source and the second location is a swimming pool light niche.

The method may further include positioning a lubricant source, including a supply of lubricant, adjacent the top inlet to selectively supply lubricant into the path from the top inlet and out the bottom outlet, to lubricate an inside of the conduit. The method also include providing a wire attachment device to releasably attach an electrical wire to the pulling line at the second location. The wire attachment device may be a crimping-type attachment device, a lasso-type attachment device, or a self-tightening sheath-type attachment device that slides over the end of the electrical wire and self-tightens as the electrical wire is pulled by the pulling line. The method may still further include positioning a pushing tip at a distal end of the pulling line and configured to assist the fluid in drawing the pulling line though the conduit.

DETAILED DESCRIPTION OF THE INVENTION

Figure 1:
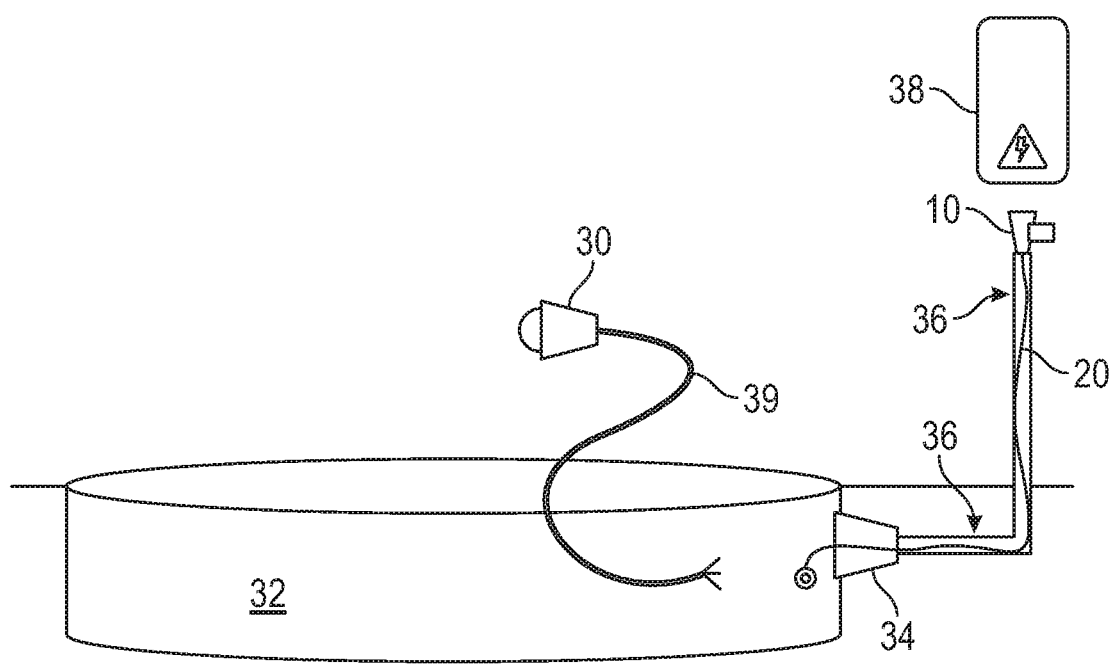
FIG. 1 is a schematic diagram illustrating a system and wire pulling device, being used for a swimming pool light, according to an embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of an electrical wire pulling device 10 in accordance with features of the present invention will be described with reference to the drawing figures (FIGS. 1-5). The wire pulling device 10 is used to pull cords or wires from the inside of a swimming pool, for example, from the light niche via the light conduit and to the outside, where the transformer and/or power source is installed. Of course, it could also be used by technicians to pull other types of electrical lines or cords through conduits or other types of raceways at any installation site.

A feature of the wire pulling device 10 is the use of a venturi effect. In a typical venturi arrangement, a fluid flows from a pressure supply port into an ejector. A constriction in the venturi nozzle increases the flow velocity of the fluid. After exiting the venturi nozzle, the fluid expands and flows through the receiver nozzle into the outlet port. In the process, a vacuum is created in the chamber between the venturi and receiver nozzle, which causes fluid to be drawn in from the vacuum port. The vacuumed fluid and exhaust fluid both leave through the outlet port.

FIG. 1 is a schematic diagram illustrating a system and wire pulling device 10, being used for a swimming pool light 30, according to an embodiment of the present invention. An in-ground swimming pool 32 includes a light niche 34 at one or more locations within the pool shell. The light niche 34 is coupled to a conduit 36. Such conduits 36 are typically rigid (e.g. PVC or metal) and extend (e.g. underground) between the niche 34 and a junction box 38 or transformer (i.e., power source) to carry the light electrical cord 39. Such a conduit 36 typically includes one or more turns (e.g. 90-degree elbows or sweeps) and may run in lengths of 25 to 200+ feet, for example.

Figure 2:
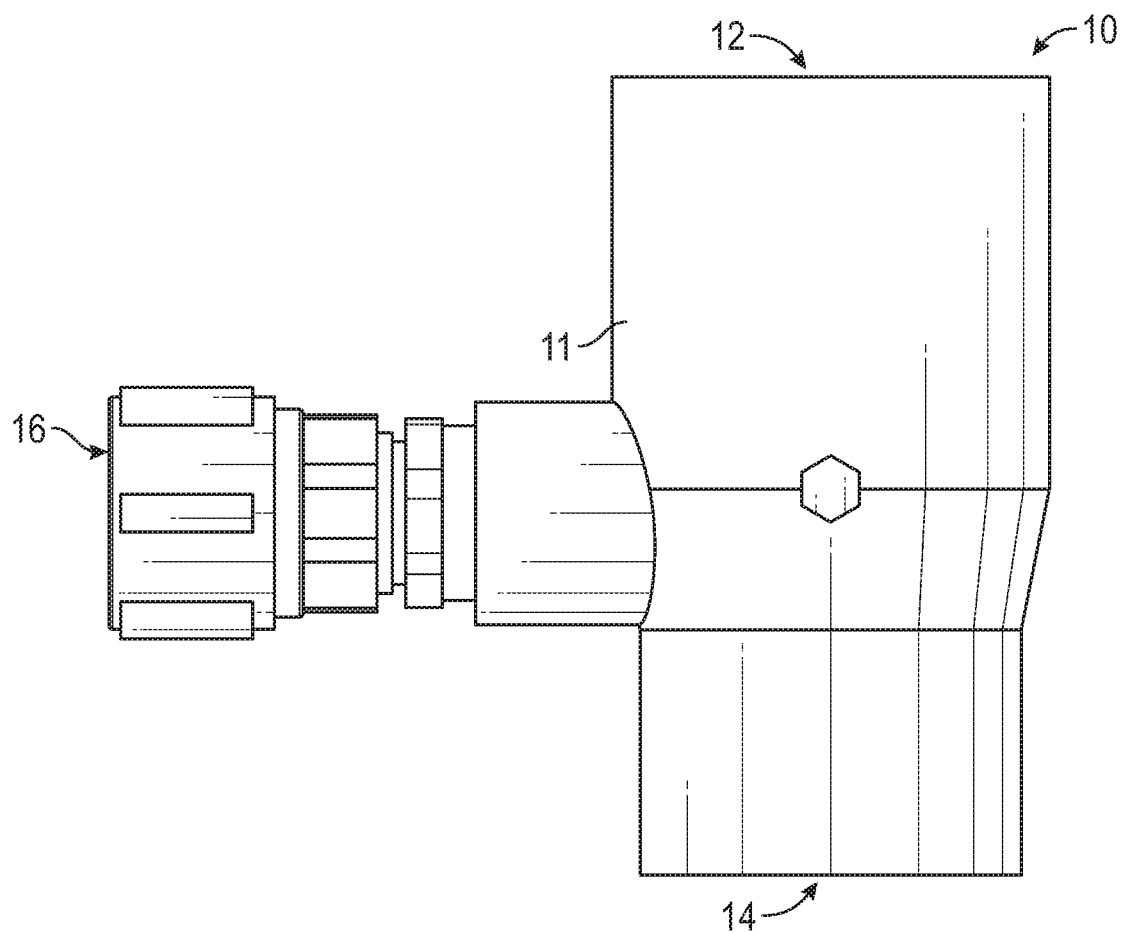
FIG. 2 is a side view of the wire pulling device body according to an embodiment of the present invention.
Figure 3:
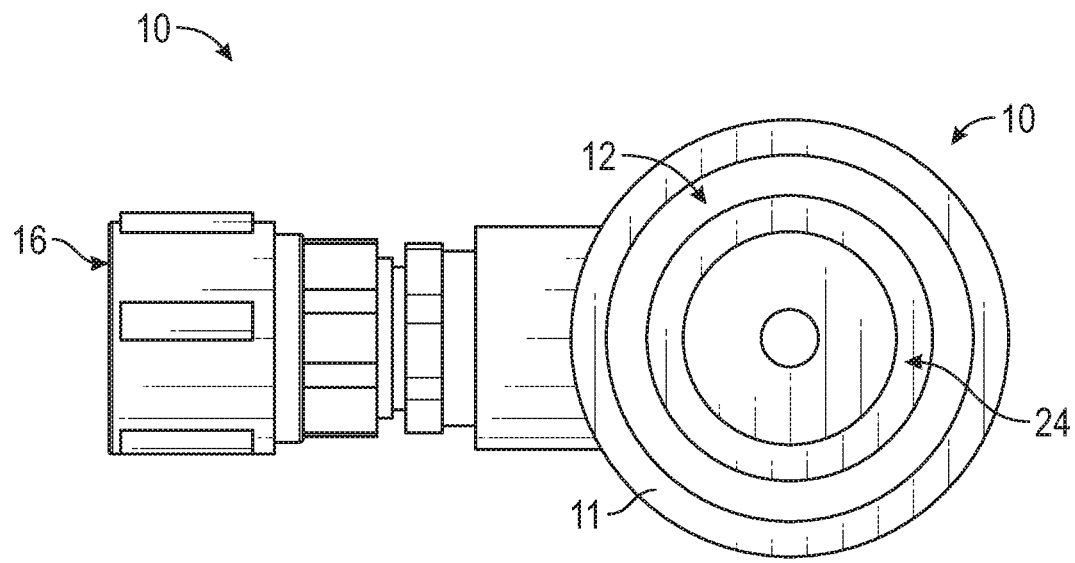
FIG. 3 is a top view of the wire pulling device body according to an embodiment of the present invention.
Figure 4:
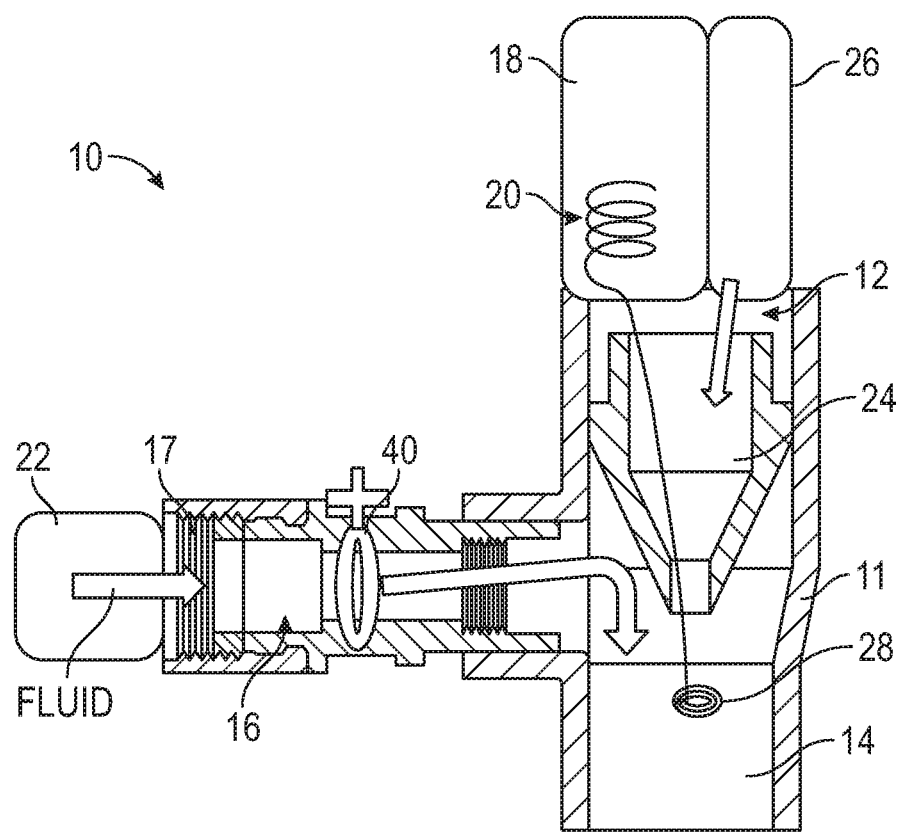
FIG. 4 is a side cut-away view illustrating the wire pulling device including the internal constrictor according to an embodiment of the present invention.

FIG. 2 is a side view of the wire pulling device body 11. FIG. 3 is a top view of the wire pulling device body 11. FIG. 4 is a side cut-away view illustrating the wire pulling device 10. Here, the device 10 has a T-shaped cylindrical body 11 and includes a top inlet 12 in line with a bottom outlet 14, and a side fluid inlet 16. Other cross-sectional shapes of the body 11 are contemplated. A source 18 of pulling line 20, e.g. a string or tape, is adjacent the top inlet 12. The source 18 could be a spool, for example.

A fluid source 22, e.g. water or compressed air, is coupled to the side fluid inlet 16. The bottom outlet 14 is configured to be coupled to the conduit 36 (e.g., a light niche conduit) at the end near the power source 38. A constrictor 24 or nozzle is included within the device body 11 and tapers down from the top inlet 12 towards the bottom outlet 14 adjacent the side fluid inlet 16. The device 10 is pressurized with a fluid such as water from the fluid source 22 (e.g. a garden hose) via the side fluid inlet 16. This water is shot into the device body 11. The water is then pushed downwards into the conduit 36 towards the light niche 34 conduit while, via the force and pressure differential or vacuum, drawing the pulling line 20, e.g. string, from the source 18 via the top inlet 12 towards the light niche 34 via the bottom outlet 14 and the conduit 36.

A lubrication source 26 may also be included at the top inlet 12 so that lubricant may also be drawn through the conduit with the pulling line 20. Wire-pulling compound, also called cable lube or lubricant, is designed to make it easier to pull electrical wires and cables through conduit runs. It comes in a few different forms and reduces the coefficient of friction between wires and conduits to help minimize damage to the wire insulation or cable jackets and make pulling smoother, safer, and faster.

There are three main types of wire-pulling lubricant: liquid, gel, and wax. Liquid lubricant can be poured or drawn into the conduit along with the wiring. For this reason, liquid is best for vertical or downhill runs of conduit. There are also liquid lubricants in spray form. Gel lubricants can be applied to wiring before it enters the conduit and does not drip off like liquid lubes. Gel is best for overhead applications or wherever dripping lube is problematic. Wax lubricants perform similarly to gel lubes (they stick to wires and do not drip) but are more heat-tolerant than gels, making them preferable for hot-weather situations.

The conduit 36 is pressurized with the fluid (e.g., water), therefore loose debris may be blown out of the conduit (e.g., into the swimming pool 32 or a strainer). The string 20 may be tied in a knot at the end. A plastic tip 28 or another object may be secured or tied to the end of the string 20 to assist and/or increase the pushing of the string toward the niche 34 via the conduit 36.

Figure 5A:
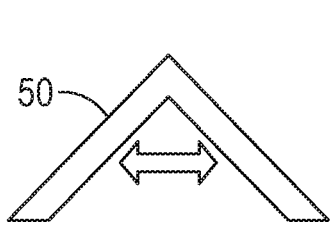
FIGS. 5A-5C are schematic diagrams illustrating example embodiments of the wire attachment device as a crimping-type attachment device, a lasso-type attachment device, and a self-tightening sheath-type attachment device, respectively.
Figure 5B:
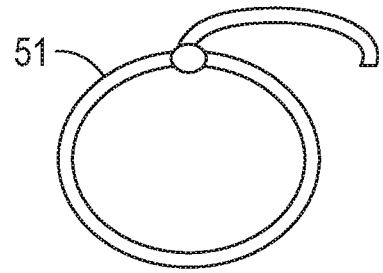
Figure 5C:
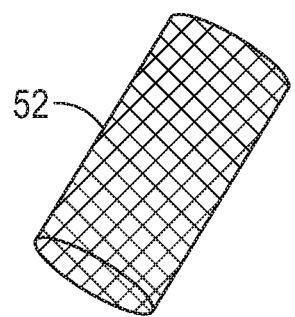

Additionally, a light cord attachment device may be included at the distal end of the pulling line 20. The light cord attachment device, for example, may be a crimping-type attachment device 50, a lasso type attachment device 51, or may also be a self-tightening sheath-type attachment device 52 that slides over the end of the light cord and self-tightens as it is pulled. FIG. 5A is a schematic diagram illustrating an example embodiment of the wire attachment device as a crimping-type attachment device. FIG. 5B is a schematic diagram illustrating an example embodiment of the wire attachment device as a lasso-type attachment device. FIG. 5C is a schematic diagram illustrating an example embodiment of the wire attachment device as a self-tightening sheath-type attachment device.

The attachment device may be positioned at the end of the pulling line 20 prior to traveling through the conduit or may be configured to be attached to the end of the pulling line 20 after the line reaches the niche.

Since the device 10 uses the venturi effect, it's sucking in air as the string 20 is getting blown through the conduit 36. Once the string 20 is blown into the swimming pool 32, it can be secured to a swimming pool light cord 39. The light cord 39 may then be lubricated and fed into the light niche 34.

Another advantage of the device 10 includes the blowing of lubricant through the conduit. Once the string is secured or tied off to the light cord, the device is operated or turned on again (blowing lubricant, water and/or air through the conduit), making it much easier for the cord to be pulled back through to the junction box.

As shown, this embodiment of the device 10 the body 11 is larger on the top, smaller on the bottom and tapers off to the size of the light niche conduit 36. The body 11 has a cylindrical cone on the top (e.g., as seen in FIG. 2) pointing down with a hole in the middle of the cone (e.g., as seen in FIG. 3). This creates the venturi effect and pushes the fluid and string 20 downwards into the conduit 36. Other relative dimensions are contemplated as long as the desired effect is achieved.

The side fluid inlet 16 of the device 10 may be an internally threaded 17 water hose hook up and may also include a quick disconnect. A start and stop switch valve 40 may also be included, as illustrated in FIG. 4.

The wire pulling device 10 is relatively lightweight and may be made of plastic (e.g. PVC) but can be made of other materials such as metal.

A method aspect of the present invention is for pulling electrical wire through a conduit 36 extending between a first end at a first location, and a second end at a second location. The method includes positioning an electrical wire pulling device 10 adjacent the first end of the conduit 36. The electrical wire pulling device 10 including a T-shaped hollow body 11 including a top inlet 12 in line with a bottom outlet 14, and a side inlet 16 transversely intersecting a path between the top inlet and the bottom outlet. A constrictor 24 is positioned within the hollow body 11 in the path between the top inlet 12 and the bottom outlet 14, and adjacent the side inlet 16. A pulling line source 18, including a supply of pulling line 20, is positioned adjacent the top inlet 12 and configured to supply the pulling line into the path from the top inlet and out the bottom outlet 14. The constrictor 24 has a tapered section, adjacent the side inlet 16, and tapering in a direction towards the bottom inlet 14. The method further includes coupling the side inlet 16 to a fluid source 22 to supply a fluid directed towards the tapered section of the constrictor 24 in the hollow body 11 to be pushed downward towards the bottom outlet 14 and create a pressure differential that draws the pulling line from the pulling line source 18 towards the bottom outlet and into the conduit 36 at the first end and towards the second end. Then, an electrical wire is attached to the pulling line 20 at the second location and the electrical wire is pulled through the conduit 20 to the first location.

The pulling line 20 may be a string or a tape, and the pulling line source 18 may be a spool. The fluid source 22 may be a water source or a compressed gas source, and the side inlet 16 may be an internally threaded hose connector 17. The first location may be adjacent a power source 38 and the second location is a swimming pool light niche 34.

The method may further include positioning a lubricant source 26, including a supply of lubricant, adjacent the top inlet 12 to selectively supply lubricant into the path from the top inlet and out the bottom outlet 14, to lubricate an inside of the conduit 20. The method also include providing a wire attachment device to releasably attach an electrical wire 39 to the pulling line at the second location. The wire attachment device may be a crimping-type attachment device 50, a lasso-type attachment device 51, or a self-tightening sheath-type attachment device 52 that slides over the end of the electrical wire and self-tightens as the electrical wire is pulled by the pulling line 20. The method may still further include positioning a pushing tip 28 at a distal end of the pulling line 20 and configured to assist the fluid in drawing the pulling line though the conduit 36.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The above description provides specific details, such as material types and processing conditions to provide a thorough description of example embodiments. However, a person of ordinary skill in the art would understand that the embodiments may be practiced without using these specific details.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof.

Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention, and although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item. Thus, the scope of the invention should be determined by the appended claims and their legal equivalents, and not by the examples given.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An electrical wire pulling device configured to pull wire through a conduit extending between a first end at a first location, and a second end at a second location, the electrical wire pulling device comprising:
    a T-shaped hollow body including a top inlet in line with a bottom outlet, and a side inlet transversely intersecting a path between the top inlet and the bottom outlet;
    a constrictor positioned within the hollow body in the path between the top inlet and the bottom outlet, and adjacent the side inlet;
    a lubricant source, including a supply of lubricant, positioned adjacent the top inlet and configured to selectively supply lubricant into the path from the top inlet and out the bottom outlet, to lubricate an inside of the conduit;
    a pulling line source connected to and positioned adjacent the top inlet;
    a supply of pulling line, including a pushing tip at a distal end of the pulling line, positioned to be at least partially housed by the pulling line source and configured to be fed from the top inlet, out the bottom outlet, and into the conduit;
    wherein the pulling line source is configured to supply the pulling line into the path from the top inlet and out the bottom outlet;
    wherein the constrictor has a tapered section, adjacent the side inlet, and tapering in a direction towards the bottom outlet;
    wherein the pulling line is configured to be fed through the tapered section of the constrictor;
    wherein the bottom outlet is configured to be positioned adjacent to the first end of the conduit at the first location;
    wherein the side inlet is configured to be threadably coupled to a fluid source to supply a fluid into the hollow body and directed towards the tapered section of the constrictor to be pushed downward towards the bottom outlet and create a pressure differential that draws the pulling line from the pulling line source towards the bottom outlet and into the conduit at the first location and towards the second location; and
    wherein the lubricant is chosen from a group consisting of a liquid, gel, and wax.

2. The electrical wire pulling device according to claim 1, wherein the pulling line comprises at least one of a string and a tape.

3. The electrical wire pulling device according to claim 2, wherein the pulling line source comprises a spool.

4. The electrical wire pulling device according to claim 1, wherein the fluid source comprises at least one of a water source and a compressed gas source.

5. The electrical wire pulling device according to claim 1, wherein the side inlet comprises an internally threaded hose connector.

6. The electrical wire pulling device according to claim 5, further comprising a valve at the side inlet and configured to selectively control the supply of fluid from the fluid source.

7. The electrical wire pulling device according to claim 1, wherein the first location is adjacent a power source and the second location includes a swimming pool light niche.

8. The electrical wire pulling device according to claim 1, wherein the side inlet comprises a quick-disconnect hose hookup.

9. The electrical wire pulling device according to claim 1, further comprising a wire attachment device configured to releasably attach an electrical wire to the pulling line at the second location.

10. The electrical wire pulling device according to claim 9, wherein the wire attachment device comprises at least one of a crimping attachment device, a lasso attachment device, and a self-tightening sheath attachment device that slides over the end of the electrical wire and self-tightens as the electrical wire is pulled by the pulling line.

11. The electrical wire pulling device according to claim 1, further comprising a pushing tip positioned at a distal end of the pulling line and configured to assist the fluid in drawing the pulling line though the conduit.

12. An electrical wire pulling device configured to supply pulling line that is at least partially contained within a pulling line source through a conduit extending between a first end at a first location, and a second end at a second location, the electrical wire pulling device comprising:
    a T-shaped hollow body including a top inlet in line with a bottom outlet, and a side inlet transversely intersecting a path between the top inlet and the bottom outlet;
    a lubricant source, including a supply of lubricant, positioned adjacent the top inlet and configured to selectively supply lubricant into the path from the top inlet and out the bottom outlet, to lubricate an inside of the conduit; and a constrictor positioned within the hollow body in the path between the top inlet and the bottom outlet, and adjacent the side inlet;

wherein the supply of pulling line includes a pushing tip at a distal end of the pulling line, and is configured to be fed from the top inlet, out the bottom outlet, and into the conduit;

wherein the pulling line source is configured to supply the pulling line into the path from the top inlet and out the bottom outlet;

wherein the constrictor has a tapered section, adjacent the side inlet, and tapering in a direction towards the bottom outlet;

wherein the pulling line is configured to be fed through the tapered section of the constrictor;

wherein the bottom outlet is configured to be positioned adjacent to the first end of the conduit at the first location;

wherein the side inlet is configured to be threadably coupled to a fluid source to supply a fluid into the hollow body and directed towards the tapered section of the constrictor to be pushed downward towards the bottom outlet and create a pressure differential that draws the pulling line from the top inlet and out the bottom outlet and into the conduit at the first location and towards the second location; and wherein the lubricant is chosen from a group consisting of a liquid, gel, and wax.

13. The electrical wire pulling device according to claim 12, wherein the fluid source comprises at least one of a water source and a compressed gas source.

14. The electrical wire pulling device according to claim 12, wherein the side inlet comprises an internally threaded hose connector.

15. The electrical wire pulling device according to claim 14, further comprising a valve at the side inlet and configured to selectively control the supply of fluid from the fluid source.

16. The electrical wire pulling device according to claim 12, wherein the first location is adjacent a power source and the second location includes a swimming pool light niche.

17. The electrical wire pulling device according to claim 12, wherein the side inlet comprises a quick-disconnect hose hookup.

* * * * *